US006830139B2

(12) United States Patent
Carlson et al.

(10) Patent No.: US 6,830,139 B2
(45) Date of Patent: Dec. 14, 2004

(54) MULTI-CLUTCH ARRANGEMENT

(75) Inventors: Cora Carlson, Hambach (DE); Jürgen Weth, Niederwerrn (DE); Igor Kister, Würzburg (DE); Bernd Peinemann, Niederwerrn (DE); Reinhard Feldhaus, Niederwerrn (DE); Hartmut Bach, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/266,895

(22) Filed: Oct. 8, 2002

(65) Prior Publication Data

US 2003/0079953 A1 May 1, 2003

(30) Foreign Application Priority Data

Oct. 9, 2001 (DE) .......................... 101 49 706
Sep. 5, 2002 (DE) .......................... 102 41 027

(51) Int. Cl.$^7$ .............................................. F16D 21/06
(52) U.S. Cl. ................ 192/48.8; 192/55.61; 192/70.17; 192/213.12; 192/214.1
(58) Field of Search ............................... 192/48.8, 48.9, 192/48.91, 55.61, 70.17, 212, 213.1, 213.11, 213.12, 213.31, 214.1

(56) References Cited

U.S. PATENT DOCUMENTS

| 4,317,435 A | * | 3/1982 | Kohlhage | ............... | 123/179.22 |
| 5,355,984 A | * | 10/1994 | Grabis | ..................... | 192/70.17 |
| 5,593,015 A | | 1/1997 | Kosumi | | |
| 6,634,477 B2 | * | 10/2003 | Beneton et al. | ............. | 192/48.8 |
| 2002/0065171 A1 | | 5/2002 | Raber | | |
| 2003/0024788 A1 | * | 2/2003 | Damm et al. | ............. | 192/48.91 |
| 2003/0164275 A1 | * | 9/2003 | Feldhaus et al. | ........... | 192/48.9 |

FOREIGN PATENT DOCUMENTS

| DE | 199 53 091 C1 | 8/1999 | |
| DE | 100 13 576 A1 | 9/2000 | |
| DE | 100 33 649 A1 | 2/2001 | |
| DE | 100 33 436 A1 | 4/2001 | |
| EP | 0 185 176 | 6/1986 | ........... F16D/25/10 |
| EP | 0 931 951 A1 | 1/1998 | |
| EP | 0 931 951 | 7/1999 | |

* cited by examiner

Primary Examiner—Richard M. Lorence
(74) Attorney, Agent, or Firm—Cohen, Pontani, Lieberman & Pavane

(57) ABSTRACT

A multi-clutch arrangement, especially a dual clutch for motor vehicles, comprising a first clutch area with a first pressure plate arrangement, with a first opposing support arrangement, and with a first clutch disk arrangement, which can be clamped between the first pressure plate arrangement and the first opposing support arrangement to transmit torque via the first clutch area; and a second clutch area with a second pressure plate arrangement, with a second opposing support arrangement, and with a second clutch disk arrangement, which can be clamped between the second pressure plate arrangement and the second opposing support arrangement to transmit torque via the second clutch area. A torsional vibration damper arrangement is assigned to at least one of the clutch areas, and where—relative to an axis of rotation (A)—the torsional vibration damper arrangement is arranged at least partially in the axial area of the first clutch area and/or of the second clutch area.

23 Claims, 9 Drawing Sheets

MULTI-CLUTCH ARRANGEMENT

BACKGROUND OF THE INVENTION

1. Field of the Invention

The present invention pertains to a multi-clutch arrangement, especially a dual clutch for motor vehicles, comprising a first clutch area with a first pressure plate arrangement, with a first opposing support arrangement, and with a first clutch disk arrangement, which can be clamped between the first pressure plate arrangement and the first opposing support arrangement to transmit torque via the first clutch area; and a second clutch area with a second pressure plate arrangement, with a second opposing support arrangement, and with a second clutch disk arrangement, which can be clamped between the second pressure plate arrangement and the second opposing support arrangement to transmit torque via the second clutch area.

2. Description of the Related Art

A multi-clutch arrangement of this type, designed as a dual clutch, is known from EP 0 185 176 A1. In this clutch, the two clutch areas are arranged in sequence in the direction of the axis of rotation of the overall system. A housing arrangement is provided at one axial end of the dual clutch for connection to a drive shaft, whereas two clutch-release systems, which can be activated independently of each other, act on the other axial end of the dual clutch.

Dual clutches of this type are often used in conjunction with very high-torque drive trains and in conjunction with so-called load-switching transmissions. Very strong torque-induced vibrations are excited in various speed ranges in these types of drive systems, such as direct-injection diesel engines, and unless these vibrations are damped, they are transmitted to the following part of the drive train and lead not only to considerable stress on the various components of the drive train but also to an unpleasant driving sensation.

SUMMARY OF THE INVENTION

The task of the present invention is to provide a multi-clutch arrangement, especially a dual clutch for motor vehicles, in which the disadvantages arising through the excessive excitation of vibrations are at least decreased.

According to the present invention, a torsional vibration damper arrangement is assigned to at least one of the clutch areas, and—relative to the axis of rotation—the torsional vibration damper arrangement is installed at least partially in the axial area of the first clutch area and/or of the second clutch area.

By providing at least one of the clutch areas with a torsional vibration damper arrangement, it can be ensured that a damping function is available especially in the speed ranges which are critical with respect to the excitation of vibrations. The design according to the invention also ensures a compact design, in which various systems in the clutch area on the one hand and various systems of the torsional vibration damper arrangement on the other hand are positioned so that they overlap each other in the axial direction. This is especially important for dual clutches or multi-clutch arrangements, because there are already several clutch areas arranged in a row in the axial direction in these devices and thus a comparatively large amount of space is occupied. In addition to the goal of providing a significant increase in driving comfort, this compactness of design is an essential aspect which must be considered when systems of this type are to be integrated into passenger vehicles.

To achieve an even further reduction in the amount of space required by allowing certain parts to perform double duty and/or by combining certain functions, it is proposed that at least one of the opposing support arrangements forms part of the torsional vibration-damper arrangement. For example, it is possible for the torsional vibration-damper arrangement to comprise a central disk element, which has a cover disk element on each side. These cover disk elements are rigidly connected to each other and are connected to the central disk element by a damper element arrangement for the transmission of torque, where at least one of the cover disk elements forms at least part of the opposing support arrangement of one of the clutch areas. To be able to achieve optimum space savings here while still providing the desired damping function, it is proposed that the two clutch areas with their opposing support arrangements be positioned so that they are facing each other and so that each of the opposing support arrangements forms at least part of one of the cover disk elements.

When individual parts are called upon to serve more than one function as indicated above, it must be ensured that each of the individual functions is still fully performed. It is therefore proposed that the cover disk elements be equipped with support areas designed to cooperate with the damper element arrangement and that, in the case of at least one of the cover disk elements, the support areas be provided radially—relative to an axis of rotation—inside a friction surface area provided on the cover disk element for frictional contact with a clutch disk arrangement.

Another contribution to compactness of design is achieved by providing actuating force-transmitting elements which extend through the central disk element to act on at least one of the pressure plate arrangements for the execution of clutch-engaging and disengaging operations, and by allowing at least some of these actuating force-transmitting elements to cooperate with the central disk element to limit the rotational angle of the torsional vibration damping arrangement. It is even more advantageous here for the actuating force-transmitting elements which cooperate with the central disk element to limit the rotational angle of the torsional vibration damper arrangement to pass through the opposing support arrangement assigned to the minimum of one pressure plate arrangement essentially without any play in the circumferential direction. In this way, it is also ensured simultaneously that the pressure plate arrangement and the opposing support arrangement provided for it are held essentially without freedom of rotation with respect to each other. The actuating force-transmitting elements thus also perform an additional function.

Depending on the drive unit or on the design of the drive system, it is possible for various speed or frequency ranges which are critical with respect to the excitation of rotational vibrations to be present. Because is often difficult for a single torsional vibration damper arrangement to handle several different excitation-critical ranges, it is proposed that at least one additional torsional vibration damper arrangement be provided. With respect to the direction in which the forces are transmitted, this can be installed in series with the previously discussed torsional vibration damper arrangement. It can, for example, be installed in the area of a clutch disk arrangement. According to another design variant, which can be realized alternatively or additionally, the minimum of one additional torsional vibration damper arrangement is designed to be connected on the input side to a drive element and is connected on the output side to the central disk element of the torsional vibration damper arrangement.

It is also obvious that, alternatively or in addition, the minimum of one additional torsional vibration damper arrangement could be installed so that, in terms of the transmission of forces, it is in parallel with the previously discussed torsional vibration damper arrangement. This can be accomplished by connecting the minimum of one additional torsional vibration damper arrangement on the input side to a drive element and also to an input area of the first torsional vibration damper arrangement, whereas, on the output side, it is connected to an output area of the torsional vibration damper arrangement.

The multi-clutch arrangement according to the invention can also be designed in such a way that, in the area of a housing arrangement of the clutch, the clutch arrangement is supported in the axial direction and/or in the radial direction with respect to a stationary assembly, preferably the transmission housing. It is possible to produce a complete force-feedback circuit within the clutch arrangement upon exertion of an actuating force and thus to relieve the bearing of the drive shaft of stress by, for example, supporting an input area of the torsional vibration damper arrangement in the axial and/or in the radial direction by way of a bearing arrangement on an output area of the torsional vibration damper arrangement.

So that the vibrational damping characteristic of the torsional vibration damper arrangement can be adjusted, the arrangement can also have a frictional damping device. The friction device is preferably located radially outside a damper element arrangement of the torsional vibration damper arrangement.

According to one of the other aspects exploiting the principles of the present invention, an easy-to-construct embodiment is obtained by providing the torsional vibration damper arrangement with a primary side, which is connected to the drive element, and a secondary side, which is connected to the opposing support arrangement of the multi-clutch arrangement, the secondary side being connected to the primary side for the purpose of transmitting torque by a damper element arrangement.

To arrive in this case at the most compact possible design in the axial direction, it is proposed that the secondary side and/or the damper element arrangement axially overlap a pressure plate arrangement of one of the clutch areas. For this purpose, the damper element arrangement is preferably located essentially radially inside the pressure plate arrangement of the one clutch area.

So that it is possible to compensate for an offset between the two shaft areas to be connected by way of this system, to compensate for a tilt between these two shaft areas when the torsional vibration damper arrangement and the multi-clutch arrangement are staggered axially in the manner previously described, or to compensate for the wobbling of the drive shaft with respect to the transmission input shaft or shafts which may occur especially in the case of high-torque, direct-injection spark-ignition and diesel engines, it is proposed that the secondary side of the torsional vibration damper arrangement be connected with axial elasticity to the opposing support arrangement. As a result of this axially elastic connection, it is possible to disconnect the torsional vibration damper arrangement from the opposing support arrangement with respect to wobbling.

It is also possible for the multi-clutch arrangement to be is supported at least axially with respect to the drive element by the secondary side of the torsional vibration damper arrangement.

Other objects and features of the present invention will bercome apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
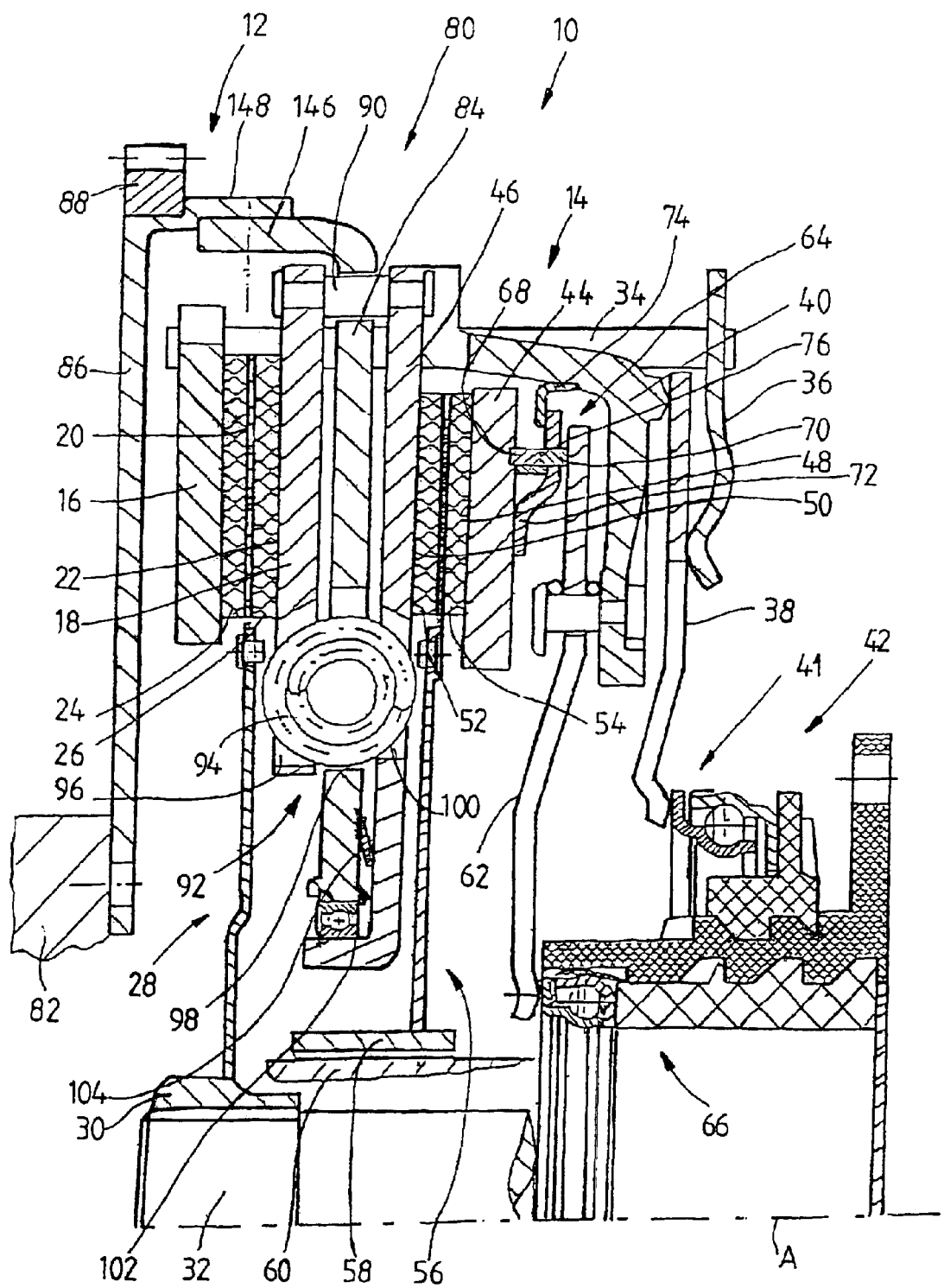
FIG. 1 shows a partial longitudinal cross section through a dual clutch according to a first embodiment of the invention.

FIG. 1 shows a dual clutch 10 according to the invention, which comprises two clutch areas 12, 14, which follow each other in the direction of an axis of rotation A. The first clutch area 12 comprises a pressure plate 16 and an opposing support plate 18, which face each other in the direction of the axis of rotation A. Between these two plates 16, 18, i.e., between the frictional surfaces 20, 22 of these plates, lie the friction linings 24, 26 of a clutch disk 28 of the first clutch area 12. Radially on the inside, the clutch disk 28 is provided with a hub area 30 for the nonrotatable connection to a first transmission input shaft 32.

Whereas the opposing support plate 18, as will be described below, is connected to the pressure plate 16 with essentially no freedom of rotation and is also essentially stationary in the direction of the axis of rotation A—relative to the overall arrangement of the dual clutch—, the pressure plate 16 can be pushed back and forth in the axial direction to perform clutch-engaging and clutch-release operations. For this purpose, several actuating force-transmitting rods 34 are distributed around the circumference, which rods pass through corresponding openings in the opposing support plate 18 with a small amount of play. As a result, these actuating force-transmitting rods 34 are able to transmit an actuating force to the pressure plate 16 and, second, they establish the nonrotatable connection between the pressure plate 16 and the opposing support plate 18. On the end opposite the pressure plate 16, the actuating force-transmitting rods 34 carry an actuation element 36, designed as a ring, for example, upon the radially inner area of which force is exerted by a stored-energy device 38, designed as a diaphragm spring, for example, to transmit a clutch-engaging force to the pressure plate 16. In its radially outer area, the stored-energy device 38 is supported on a housing component 40. Radially on the inside, an actuation area 41 of an actuating mechanism 42 can exert a pushing type of action on the stored-energy device 38 to execute the clutch-release operation.

The second clutch area 14 also comprises a pressure plate 44 and an opposing support plate 46, situated opposite the pressure plate in the direction of the axis of rotation A. Between the friction surfaces 48, 50, there are again the friction linings 52, 54 of a clutch disk 56. This disk is provided radially on the inside with a hub area 58 for nonrotatable connection to a second transmission input shaft 60, which concentrically surrounds the first transmission input shaft 32.

A stored-energy device 62 of the second clutch area, 14, designed again, for example, as a diaphragm spring, is supported in its radially middle area on the housing component 40; its radially outer area exerts force on the pressure plate 44 by way of a wear-compensating device 64; and its radially inner area can be acted on with a pushing type of action by an actuating area 66 of the actuating mechanism 42 to perform the clutch-release operation. It should be pointed out that, both in the case of the first clutch area 12 and also in the case of the second clutch area, releasing force-producing elements designed in the form of, for example, leaf springs, helical compression springs, or other elastic elements can be assigned to the pressure plates 16 and 44 to move them away from their assigned opposing support plates 18, 46 during the execution of the, clutch-release operation.

With respect to the wear-compensating device 64, this is of the conventional type and can be designed as described in U.S. Pat. No. 6,123,180, which is incorporated herein by reference. A brief explanation will be given here of the wear-compensating device. It has two adjusting rings 68, 70, which can rotate with respect to each other, one of which is supported on the pressure plate 44, whereas the other is acted upon by the stored-energy device 62. On the sides of the rings which face each other, the adjusting rings 68, 70 have complementary slanted surfaces. Under the pretensioning effect of a spring (not shown), relative rotation of the two adjusting rings 68, 70 leads to an increase in the size of the axial dimension of the assembly comprising these two rings 68, 70. A first detection element 72, which can be designed as a leaf spring, for example, is also attached to the pressure plate 44. This extends radially outward and over the adjusting ring 70 and rests on the adjusting ring 70 under elastic pretension in the axial direction, thus pressing the two adjusting rings 68, 70 against each other and also against the pressure plate 44. In the radially outer area, the first detection element 72 overlaps a second detection element 74, attached rigidly to the housing. A wedge-shaped, slider-like arresting element 76 is also provided, the wedge-shaped contour of which is pretensioned by the pretensioning force of a spring into the intermediate space formed between the first detection element 72 and the pressure plate 44.

When the friction linings 52, 54 become worn as a result of the operation of the clutch, the pressure plate 44 approaches the opposing support plate 46 in the axial direction. The radially outer area of the first detection element 72 is held back by the second detection element 74 and is thus lifted from the adjusting ring 70. Because in this state the adjusting rings 68, 70 are still under the force being exerted on them by the stored-energy device 62, they cannot rotate relative to each other. The radially outer area of the wedge-like arresting element 76, however, can shift slightly in the circumferential direction as a result of the increasing axial distance between the pressure plate 44 and the first detection element 72 until it completely fills the enlarged axial intermediate space between the pressure plate 44 and the first detection element 72 again. Upon execution of a clutch-release operation, the stored-energy device 62 releases its powerful actuating effect, so that now the pretensioning force acting between the two adjusting rings 68, 70 is sufficient to rotate the two rings with respect to each other, although in fact only the adjusting ring 68 rotates relative to the pressure plate 44, because the adjusting ring 70 is prevented from turning by the first detection element 72. This relative rotation with a corresponding increase in the size of the total axial dimension of this assembly continues until the adjusting ring 70 comes into contact again with the first detection element 72. The extent to which axial wear has thus been compensated is exactly equal to the value previously registered by the interaction between the two detection elements 72, 74.

Although obvious, it should be pointed out that a corresponding wear-compensating device could also be provided for the first clutch area 12. This could act between the housing component 40 and the stored-energy device 38, but it could also act between the stored-energy device 38 and the actuating element 36. It should also be pointed out that basically any type of wear-compensating device could be provided on at least one of the clutch areas 12, 14.

The dual clutch 10 shown in FIG. 1 also has a torsional vibration damper arrangement 80 integrated into this clutch 10. The input side of this arrangement is designed to be connected to a drive shaft 82. Here the radially outer area of a central disk element 84 essentially constituting the input side can, for example, be connected to a connecting component 86, designed, for example, as a flexible plate or the like, which can be connected radially on the inside to the drive shaft 82. The connecting component 86 can also carry a gear rim 88 for the starter motor. It can be seen that the washer-like area of the central disk element 84 is situated axially between the two opposing support plates 18, 46. The central disk element 84 of the torsional vibration damper arrangement 80 can be connected to the disk-like connecting element 86 by the use of the approximately cylindrical sections 146, 148, one of which can be inserted into the other, and into which connecting elements such as fastening screws or fastening rivets can then be introduced radially from the outside.

The opposing support plates 18, 46 thus also form at the same time the cover disk elements of the torsional vibration damper arrangement 80. In their radially outer area, the cover disk elements or opposing support plates 18, 46 are connected rigidly to each other by a plurality of spacer elements 90, distributed around the circumference. The spacer elements 90 pass through the central disk element 84 at several circumferential points, so that, in cooperation with the central disk element 84, they limit the relative rotational angle of the torsional vibration damper arrangement 80. It should be pointed out here that the actuating force-transmitting rods 34 also pass through appropriate openings or holes in the central disk element 84, so that, in addition or as an alternative to the function of the spacer elements 90 just described, it is possible for the cooperation of the one or more actuating force-transmitting rods 34 with the central disk element 84 to serve the additional function of limiting the rotational angle of the input area of the torsional vibration damper arrangement 80, consisting essentially of the central disk element 84, and of the output area, consisting essentially of the cover disk elements or support plates 18, 46. In this case, it is possible, for example, for a spacer element 90 to come after each of the actuating force-transmitting rods 34 in the circumferential direction. Thus the central disk element 84 can still be comparatively strong in spite of the various holes passing through it. The circumferential dimensions of these openings can be calculated appropriately so that ultimately either the elements 90 or the elements 34 or possibly both sets of elements can cooperate with the central disk element 84 to provide the rotational angle-limiting function.

The torsional vibration damper arrangement 80 comprises a damper element arrangement 92 in the form of, for example, several damper springs 94 or groups of damper springs 94 oriented essentially in the circumferential direction. Spring windows or openings 96, 98, 100 are provided in the central disk element 80 or in the opposing support plates 18, 46, these windows being assigned to the damper springs 94 as support areas. The damper springs 94 are supported in the known manner in these spring windows, i.e., on the edges of the windows extending in the circumferential direction, so that a torque-transmitting connection is established between the central disk element 84 and the opposing support plates or cover disk elements 18, 46 via the damper springs 94 of the damper element arrangement 92. It can also be seen that, in the radially inner area, the cover disk element, i.e., the opposing support plate 46, has an axial shoulder, on which, via a bearing 102, the output area of the torsional vibration damper arrangement 80, that is, essentially the assembly comprising the opposing support plates 18, 46 and the components connected rigidly to them, is supported both axially and radially with respect to the central disk element 84, which essentially constitutes the input area. It should be pointed out that any type of bearing, that is, for example, a bearing with rolling elements, a plain bearing, etc., could be used. As a result of this bearing, ultimately the entire part of the dual clutch 10 coming after the cover disk elements, i.e., the opposing support plates 18, 46, in the path of torque transmission is supported axially and radially with respect to the central disk element 84 and thus also with respect to the drive shaft 82. This means that the actuating force exerted by activation of the actuating areas 41, 66 is also transmitted axially via this bearing 102 to the central disk element 84 and thus to the drive shaft 82. This is essentially also true because the radially outer area of the housing component 40, on which the two stored-energy devices 38, 62 are supported, is also rigidly connected to the opposing support plates 18, 46 by, for example, the use of the spacer elements 90.

It can also be seen in FIG. 1 that the torsional vibration damper arrangement 80 has a dry friction device assigned to it, which, for example, can comprise a disk spring or an undulated washer 104, resting under pretension between the central disk element 84 and the cover disk element 46. This spring rests under pretension against the associated surface areas themselves or against friction rings especially provided for the purpose.

The function of a torsional vibration damper is therefore integrated into the dual clutch 10 in such a way that various components of the torsional vibration damper arrangement 88 are used simultaneously as components of the dual clutch 10. By combining these parts or functions, a very compact unit for damping the vibrations in the two clutch areas 12, 14 can be obtained.

It should also be pointed out that, in the case of the embodiment shown in FIG. 1 as well as in all of the other embodiments to be described later, additional elements such as parts made of sheet metal or plate can be attached by rivets, for example, to the opposing support plates 18 and/or 46 to interact with the damping springs 94; these additional elements can then take over the function of supporting or guiding the damping springs 94 and also the function of the bearing. Such an approach is advantageous, because elements made of sheet metal or plate can be fabricated more easily. The opposing support plates 18, 46 are preferably produced of cast material because of the stresses which they must withstand.

It should also be mentioned that the design according to the invention, in which a torsional vibration damper arrangement is integrated into a dual clutch, can be provided regardless of whether or not the various clutch areas are of the normally closed type shown in FIG. 1 or of the normally open type, in which the activation of the actuating areas 41, 66 does not produce a clutch-release force which cancels out the actuating effect of the stored-energy devices as in the arrangement of FIG. 1, but which instead produces a clutch-engaging force, which is transmitted, for example, by lever elements or the like to the pressure plates. It is also obvious that one clutch area could be designed as a normally open system and another clutch area as a normally closed system.

It is also obvious that actuation can be accomplished by any desired type of actuating system such as by a hydraulic master/slave cylinder system or by conventional clutch-release forks.

Figure 2:
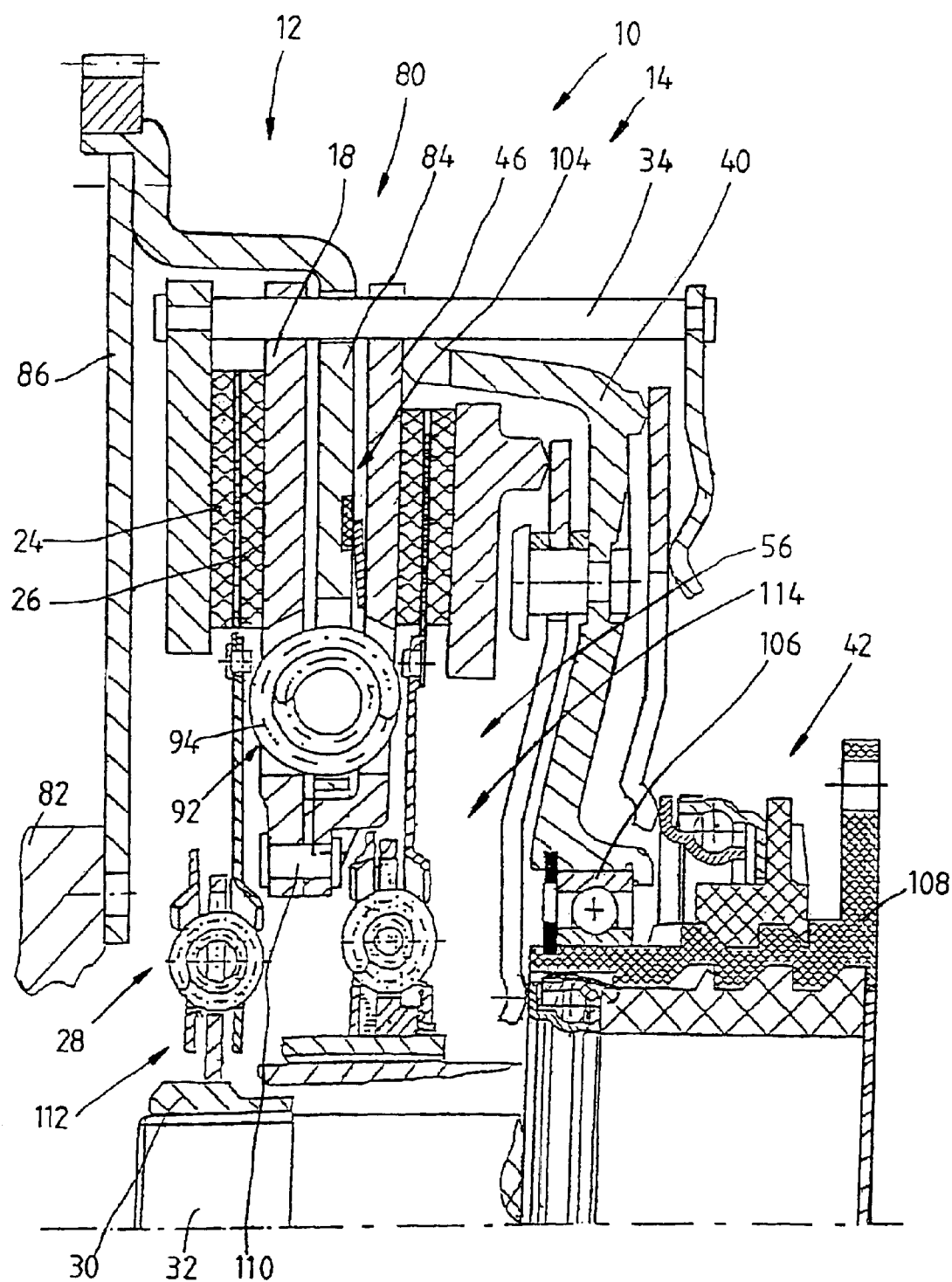
FIG. 2 shows a view, corresponding to FIG. 1, of an alternative embodiment.

FIG. 2 shows an alternative embodiment of the dual clutch 10 according to the invention. Components which are similar to those previously described with respect to their design or function are designated by the same reference numbers. The differences with respect to design and function will be discussed below.

It can be seen in FIG. 2 that the radially inner area of the housing component 40 is supported in both the axial and radial directions by a bearing 106 on an essentially stationary component 108, which is attached to, for example, the transmission housing, and which can simultaneously also be a component of the actuating mechanism 42. This means that the actuating forces exerted by the actuating mechanism 42 on the dual clutch 10, especially also on the housing component 40 of the clutch, are introduced via a force feedback circuit back into the component 108, and thus the actuating forces are not transmitted to the central disk element 84. As a result, the drive shaft 82 is also kept free of actuating forces, which brings with it a significant reduction in the loads on the drive shaft bearings. In this design, the central disk element 84 is connected to the washer-like connecting element 86 at individual radially oriented sections, through which fastening elements can then be introduced in the axial direction.

It can also be seen that the two cover disk elements or opposing support plates 18, 46 are connected rigidly together not in the radially outer area but rather in this case in the radially inner area by rivets 110 or the like. For this purpose, at least one of the cover disk elements 18, 46 is cranked in the axial direction. The friction device 104 is now radially outside the damper springs 94 and lies approximately in the radial area of the friction linings of the clutch disks 28, 56.

The rotational angle-limiting function can also be served in this embodiment both by the cooperation of the actuating force-transmitting rods 34 passing through the opposing support plates or cover disk elements 18, 46 and through the central disk element 84, with the central disk element 84, and also by the cooperation of the radially inner area of the central disk element 84 (shown in broken line) with at least one of the cover disk elements 18, 46. For this purpose, it is possible to provide appropriate openings in this cover disk element, in which radially inward-oriented projections of the central disk element 84 can move to a limited extent in the circumferential direction.

In the exemplary embodiment shown in FIG. 2, the two clutch disks 28, 56 also have torsional vibration dampers 112, 114, which are again built in the conventional manner with a central disk element and cover disk elements on the sides. The torque-transmitting connection is accomplished by damper springs; and in the embodiment shown, each cover disk element carries the associated friction lining. The central disk element is connected to the hub situated radially on the inside. Here, of course, it would also be possible to reverse this arrangement. It is also obvious that the torsional vibration dampers in the area of the clutch disks 28, 56 could also be designed with several stages. The torsional vibration damper arrangement 80 and the two torsional vibration dampers 112, 114 provided in the clutch disks 28 and 56 are, with respect to the transmission of torque, connected in series. That is, when torque is transmitted by the drive shaft 82 via, for example, the first clutch area 12 to the first transmission input shaft 32, the flow of force or torque proceeds first via the torsional vibration damper arrangement 80, then via the friction linings 24, 26 of the clutch disk 28, to the torsional vibration damper 112, and from there via the hub 30 to the transmission input shaft 32. By appropriate design of the spring characteristics and possibly also by the provision of appropriately designed dry friction devices, it is also possible to have the torsional vibration dampers 112, 114 in the clutch disks 28, 56 act as so-called no-load dampers, which are effective in fulfilling the damping function only at low applied torques, whereas the torsional vibration damper arrangement 80 is still blocked in this state by, for example, the friction device 104 and thus represents an essentially rigid component. Only when the torques to be transmitted are relatively high, i.e., torques at which the torsional vibration dampers 112, 114 have possibly already reached their end stop positions, will the frictional effect of the friction device 104 be overcome and the damping function of the torsional vibration damper arrangement 80 begin. It is then possible in particular to tune the torsional vibration dampers 112, 114 to the engine torque, with the result that the associated lowering of the natural frequency of the overall vibrating system makes it possible for the vehicle to be driven in a frequency range above a certain critical range at all times.

Figure 3:
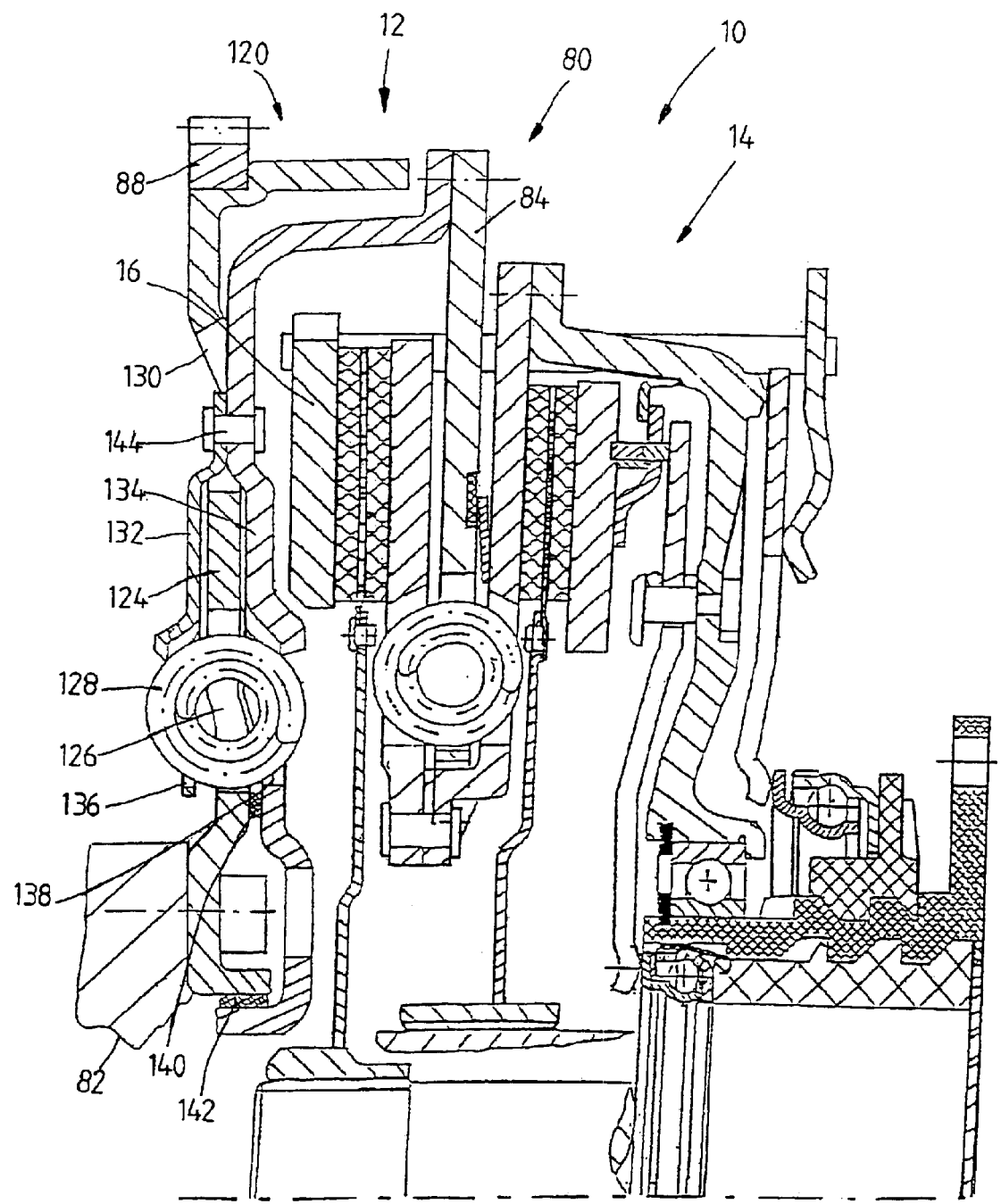
FIG. 3 shows another view, corresponding to FIG. 1, of an alternative embodiment.

Another alternative design of a dual clutch 10 according to the invention is shown in FIG. 3. Here, too, components of the same design or with the same function are again designated by the same reference numbers, as in the previously described embodiments.

In the case of the dual clutch 10 shown in FIG. 3, the central disk element 84 is connected to the drive shaft 82 by an additional torsional vibration damper 120. This, too, has a central disk element, 124, which is, for example, stamped out of sheet metal or plate and bent to shape and then screwed radially on the inside to the drive shaft 82. This disk element carries the ring gear 88 for the starter motor radially on the outside and has spring windows 126 for the damper springs 128 of the torsional vibration damper arrangement 120 in the radially middle area. It also has openings 130 distributed around the circumference, the function of which will be described further below.

On both sides of this central disk element 124 there are again cover disk elements 132, 134. These also have spring windows 136, 138 for supporting the damper springs. The cover disk element 134 close to the first clutch area 12 is supported via bearings 140, 142 on the central disk element 124 both axially and radially and its radially outer area is tightly connected by screws, for example, to the central disk element 84 of the torsional vibration damper arrangement 80, which has already been described in detail, and which is integrated into the dual clutch 10.

It can be seen that the two cover disk elements 132, 134 are tightly connected to each other by rivets 144 in the radial area of the openings 130. The openings and the circumferential sections of the two cover disk element 132, 134 situated in these openings are coordinated with respect to each other in such a way that they can simultaneously perform the function of limiting the rotational angle of this additional torsional vibration damper arrangement 120.

This system can be assembled by first screwing the radially inner area of the additional torsional vibration damper arrangement 120 to the drive shaft 82; axial access is present in this situation before the central disk element 84 has been connected to the cover disk element 134. The dual clutch 10, i.e., the remaining part, which possibly has already been connected to the transmission, is then brought up in the axial direction, and the central disk element 84 is connected to the cover disk element 134.

Here, too, the various elasticities, i.e., the various torsional vibration damper arrangements 80, 120, are connected in series with respect to each other, and they obviously could also be combined with the torsional vibration dampers in the clutch disks as shown in FIG. 2. The stiffness of the springs, which have a comparatively long excursion, can therefore be reduced. It thus becomes easier to control the natural vibrations of the system. It can also be seen in this embodiment that an axial overlap with the dual clutch 10 is present not only in the area of the torsional vibration damper arrangement 80 but also in the area of the torsional vibration damper arrangement 120, connected in series with the torsional vibration damper 80. It can be seen that the cover disk element 134, or at least the area of the cover disk element situated radially farther toward the inside, and also the damper springs 128, the lengthwise dimension of which is essentially tangential to the axis of rotation, overlap axially with the pressure plate 16 of the first clutch area 12. So that sufficient axial space is available here, the two clutch disks of the clutch areas 12, 14 are designed as rigid disks without any torsional vibration damper arrangements such as those visible in FIG. 2, for example, taking up axial room. The axial nesting of the torsional vibration damper arrangement 120 in the dual clutch 10 visible in FIG. 3 is made easier especially by the fact that, in the case of this type of dry-running torsional vibration damper 120, the damper springs 128 must be located radially relatively far toward the inside in order to reduce the centrifugal forces acting on them and thus to reduce the required support forces. It is thus possible to reduce the frictional wear in the area of the radial support of the damper springs 128.

Figure 4:
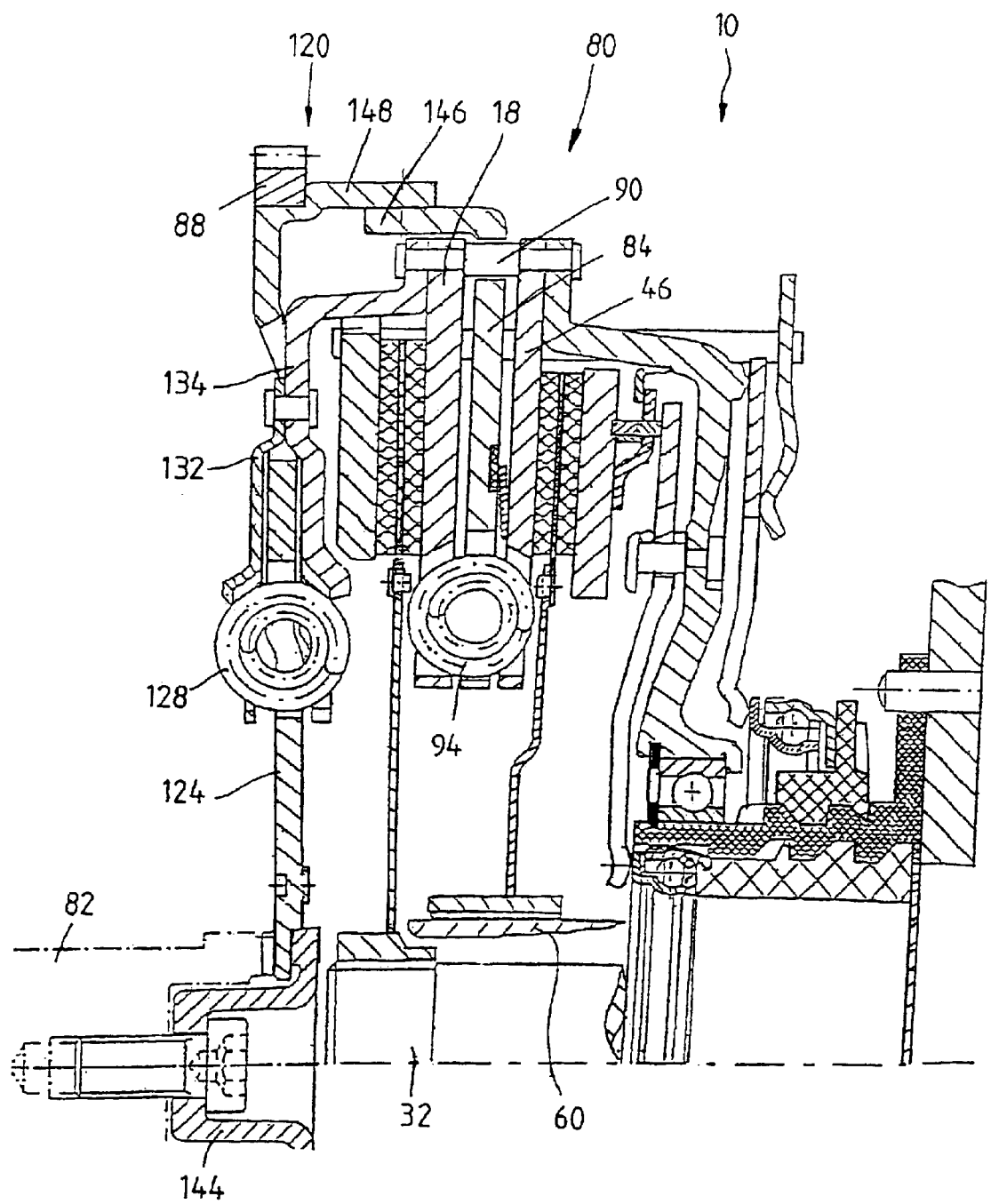
FIG. 4 shows another view, corresponding to FIG. 1, of an alternative embodiment.

FIG. 4 shows a modification of the system shown in FIG. 3. In the design shown in FIG. 4, the two torsional vibration damper arrangements 80, 120 are connected in parallel with respect to the transmission of torque. It can be seen that the torsional vibration damper arrangement 120 to be connected to the drive shaft 82 is connected on the input side, that is, by its central disk element 124, to the drive shaft 82. This central disk element 124 is also connected simultaneously to the central disk element 84 of the torsional vibration damper arrangement 80. Based on the normal direction of torque transmission from the drive shaft 82 to the two transmission input shafts 32, 60, the two input areas of the torsional vibration damper arrangements 80, 120 are therefore connected here rigidly to each other.

The torsional vibration damper arrangement 120 is connected on the output side, that is, by its two cover disk elements 132, 134, to the output side of the torsional vibration damper arrangement 80, that is, to the two cover disk elements, i.e., the opposing support plates 18, 46. This connection can be accomplished by means of, for example, the previously described spacer elements 90. The damper springs 94, 128 thus act in parallel with respect to the transmission of torque. The associated reduction in elasticity also makes it possible to lower the critical resonance frequency. Additional damping measures such as those known for wet-running, dual-mass flywheels, for example, are not required in a design such as this. As a result of the parallel connection of the various stiffnesses without any change in the total excursion of the springs, it also becomes possible to use a clutch of this type for the transmission of very high engine torques.

The system shown in FIG. 4 can be assembled by first connecting the torsional vibration damper arrangement 120 to the drive shaft 82, as before. This can be done, as shown in FIG. 4, for example, by the use of serrations on the drive shaft 82 and on the central disk element 124, which serrations are held in mutual engagement by a centrally positioned compression element 144. The area of the dual clutch 10, which may already have been attached to the transmission, is then brought up into position. The two central disk elements 84, 124 can have essentially cylindrically designed sections 146, 148, one of which can be inserted into the other, through which fastening elements such as threaded bolts or rivets can then be introduced radially from the outside.

In the case of the variant shown in FIG. 4, a modular design is also possible in which the entire dual clutch 10 is first connected to the additional torsional vibration damper arrangement 120, and this assembly is then brought up in the axial direction to the drive shaft 82. As long as the transmission input shafts 32, 60 have not yet been introduced into the clutch disks, access is available to the centrally located compression element 144 so that it can be anchored to the drive shaft 82 by tightening a threaded bolt.

It should be pointed out that installation tools with appropriate guides such as locating pins or the like can be used to facilitate the assembly of the various subunits. These assembly tools or assembly aids can already be integrated into the dual clutch itself, e.g., into the clutch disks.

Figure 5:
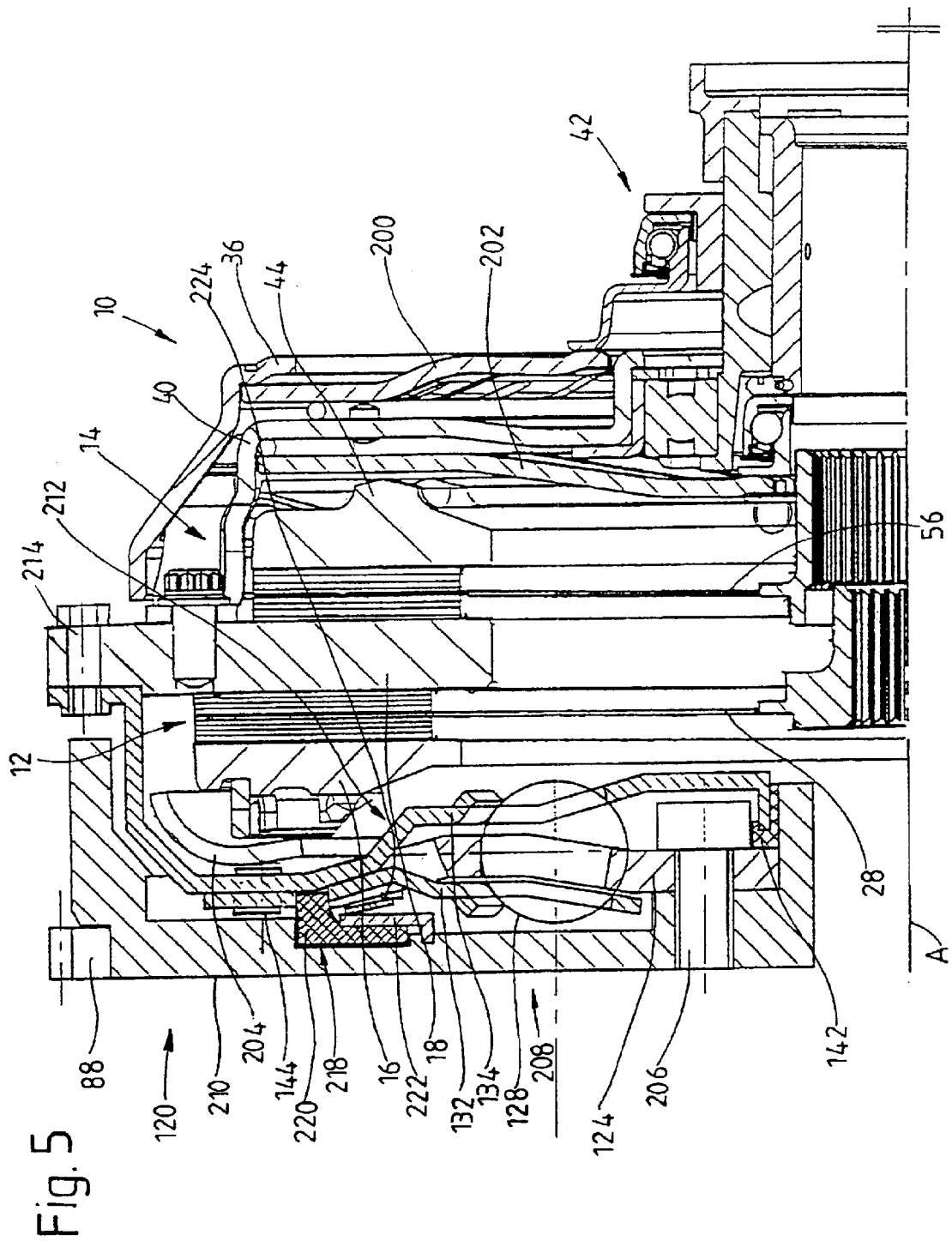
FIG. 5 shows a partial longitudinal cross section through another dual clutch according to the invention with a torsional vibration damper arrangement installed axially at the front.

FIG. 5 shows another alternative embodiment. A dual clutch 10 can be seen here, in which a plate 18 with rigid opposing support surfaces for the two clutch areas 12, 14 is provided. The radially outer area of the housing component 40 is rigidly connected to this opposing support plate 18. Instead of the previously described stored-energy devices 38, 62, engaging force-transmitting lever arrangements 200, 202 are provided in this embodiment, which are supported on the housing component 40; one of the lever arrangements is able to act on the pressure plate 44 directly, the other or on the pressure plate 16 by way of the actuating element 36 and another actuating element 204 connected to the first actuating element by tension rods (not shown) to move the pressure plate toward the opposing support plate 18. The actuating mechanism, designated in general by the number 42, therefore has here an engaging mechanism for each of the clutch areas 12, 14, each mechanism exerting the appropriate clutch-engaging force on its assigned pressure plate 16, 44 to produce the engaged state.

The torsional vibration damper arrangement 120, as also in the case of the embodiment according to FIG. 3, is staggered axially with respect to the dual clutch 10, but in this embodiment it forms the only torsional vibration damping area. The torsional vibration damper arrangement 120 comprises essentially a cup-like flywheel mass part 210 as the primary side 208, to be connected rigidly to a drive shaft (not shown) by threaded bolts 206, to which flywheel mass part the central disk element 124 is rigidly connected by the previously mentioned threaded bolts 206 in such a way as to transmit wobbling movement. The flywheel mass part 210 carries the starter ring gear rim 88 radially on the outside.

A secondary side 212 of the torsional vibration damper arrangement 120 comprises the two cover disk elements 132, 134, which can again be made as parts shaped from metal sheet or plate. These are connected rigidly to each other by rivets 144 in an area radially outside the outer end area of the central disk element 124 and cooperate radially on the inside, like the central disk element 124, with the damping springs 128, which are oriented essentially in the tangential direction with respect to the axis of rotation A. Here, too, we can see that these damper springs 128 are situated in a radial area which is essentially radially inside the pressure plate 16 of the clutch area 12 and also radially inside the ring-shaped or cup-shaped actuating element 204 or a wear-compensating device, via which this actuating element 204 can possibly act on the pressure plate 16. There can therefore be an axial overlap between the torsional vibration damper arrangement 120 and the dual clutch 10, namely, in that at least the cover disk element 134, the damper springs 128 of the secondary side 212, and, as can be seen in FIG. 5, also an area of the central disk element 124 of the primary side 208 axially overlap components of the dual clutch 10, namely, the actuating element 204 and to some extent also the pressure plate 16 of the clutch area 12 to be positioned near the engine.

The torsional vibration damper arrangement 120 is connected to the dual clutch 10 in a section of the cover disk element 134 which extends radially on the outside toward the opposing support plate 18 and which is screwed by threaded bolts 214, accessible from the transmission side, to the radially outer area of the opposing support plate 18. Because this screwed connection is made from the transmission side during the assembly process, the torsional vibration damper arrangement 120 can first be screwed by the threaded bolts 206 to the drive shaft, and then the dual clutch 10 can be brought up in the axial direction and screwed by the threaded bolts 214 from the transmission side to the secondary side 212 of the torsional vibration damper arrangement 120.

It can also be seen in this embodiment that there is a bearing element 142, by means of which the secondary side 212 is supported in the radially inner area of the cover disk element 134 both axially and radially with respect to the primary side 208. In this way, the entire dual clutch 10 is also supported simultaneously both axially and radially with respect to the axis of rotation A. In addition, it is also possible, if desired, to brace or to support with a bearing (not shown here), at least radially, the dual clutch 10 in the area of the actuating mechanism 42 with respect to the power takeoff side (not shown here).

A friction device 218 also acts between the primary side 208 and the secondary side 212; in the example shown here, this device comprises a friction ring 220, carried along by the rotation of the secondary side 212. One axial side of this ring is supported against the flywheel mass part 210, whereas the other side is in frictional contact with a ring-shaped element 222 nonrotatably connected to the flywheel mass part 210. A pretensioning spring 224, which is supported against the secondary side 212, acts on the friction ring 222 and thus ensures permanent frictional contact. The friction ring 220 can engage in circumferential openings in the cover disk element 132; these circumferential openings can be designed in the form of slots, so that a friction function can be achieved with a delayed action. The introduction of this friction device 218 is therefore advantageous especially because the damper springs 128 must be located comparatively far radially toward the inside, which means that these springs must be shorter and thus also stiffer. The resonance frequency of a torsional vibration damper arrangement 120 is therefore relatively high, and the friction device 218 is therefore required especially to provide additional damping in this range.

A modification of the embodiment described above is shown in FIG. 6. The design of the dual clutch 10 is the same as that described above on the basis of FIG. 5, so that reference can be made to the preceding description.

Figure 6:
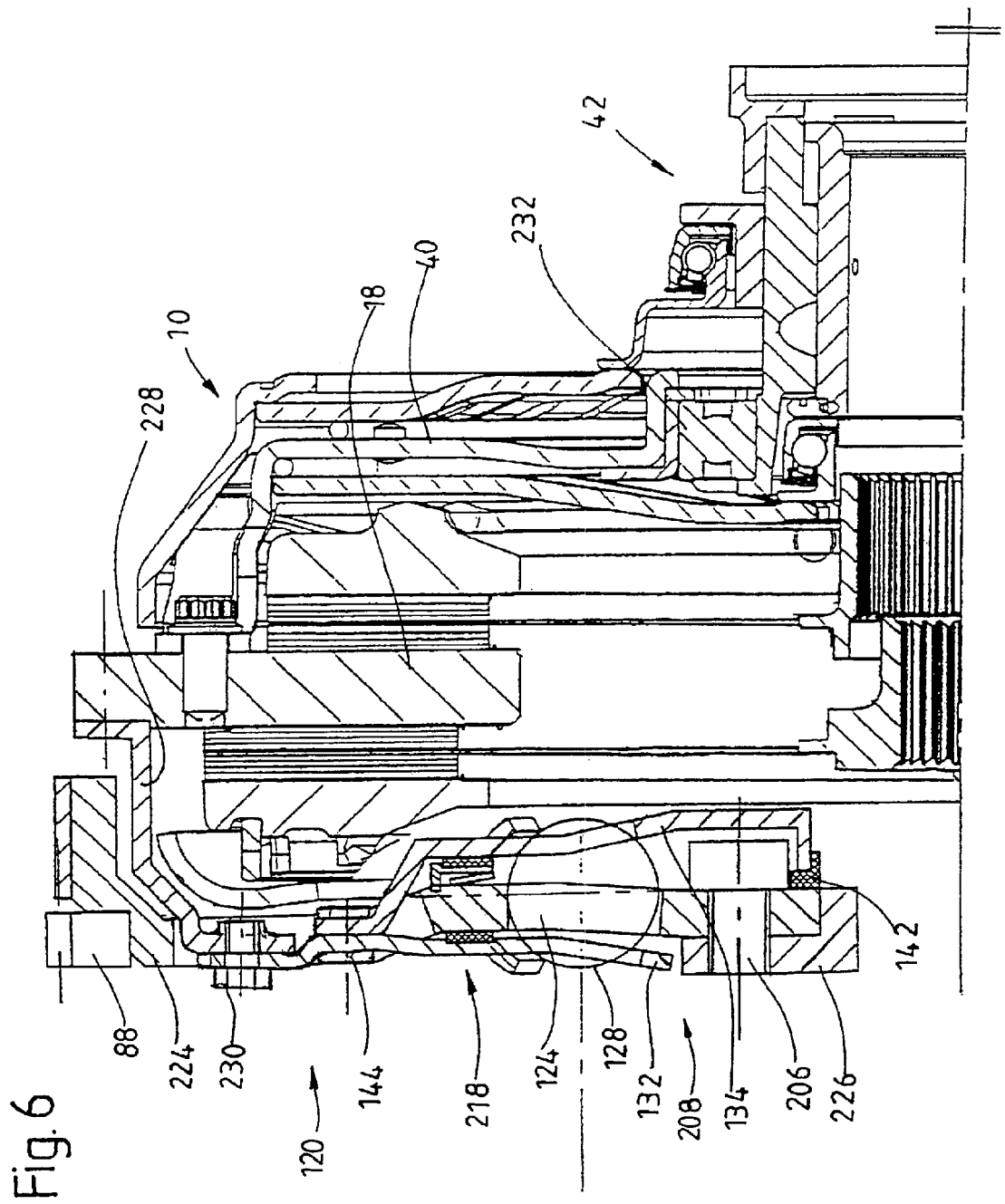
FIG. 6 shows a view, corresponding to FIG. 5, of an alternative embodiment.

In the embodiment according to FIG. 6, the primary side 208 of the torsional vibration damper arrangement 120 no longer includes the previously described cup-like flywheel mass part. Instead, a flywheel mass ring 224 is seated on the radially outer area of the central disk element 124 of the primary side 208 by, for example, a shrink-fit process. The flywheel mass ring 224 again carries, for example, the starter ring gear 88. The radially inner area of the central disk element 124 is connected by the threaded bolts 206 and the spacer ring 226 to the drive shaft (not shown). The two cover disk elements 132, 134 are riveted together radially outside the damper springs 128. In addition, a ring-shaped, for example, or a cup-shaped connecting element 228 is rigidly connected by several threaded bolts 230, possibly also by rivets or the like, to these two cover disk elements 132, 134; in the example shown here, it is connected to the cover disk element 132, which is extended radially outward beyond the rivets 144. This connecting element 228 extends toward the opposing support plate 18 so that a connection can be made here; the opposing support plate can be connected radially on the outside by screws, rivets, welds, a shrink-fit, etc., to this connecting element 228. It can be seen that, during the assembly process, the torsional vibration damper arrangement 120 can again be connected first to the drive shaft, and then the dual clutch 10, already carrying the connecting element 228, can be brought up in the axial direction, so that the threaded bolts 230 can then be inserted from the engine side to produce a rigid connection between the torsional vibration damper arrangement 120 and the dual clutch 10.

In the case of the embodiment shown in FIG. 6, the secondary side 212 and thus also the dual clutch 10 rigidly connected to it are supported by the friction element 142 only axially with respect to the primary side 208 and thus also with respect to the drive shaft (not shown). The radial bracing or support is provided by the actuator mechanism to be attached on the transmission side and by a bearing 232 provided on that mechanism, on which the housing component 40 of the dual clutch 10 is supported.

The friction device 218 is positioned here essentially between the central disk element 124 and the two cover disk elements 132, 134, radially outside the damper elements 128.

Figure 7:
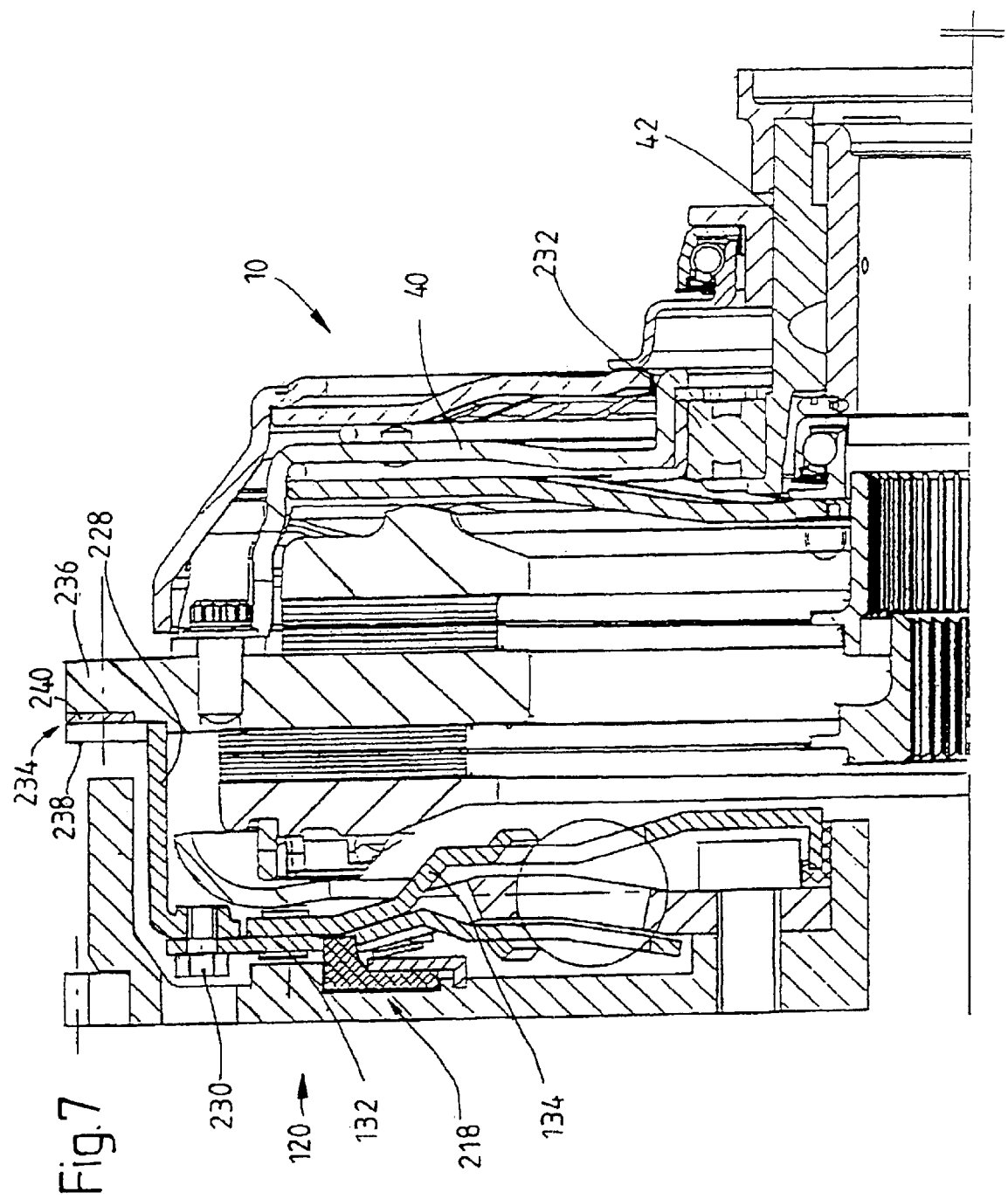
FIG. 7 shows another view, corresponding to FIG. 5, of an alternative embodiment.
Figure 8A:
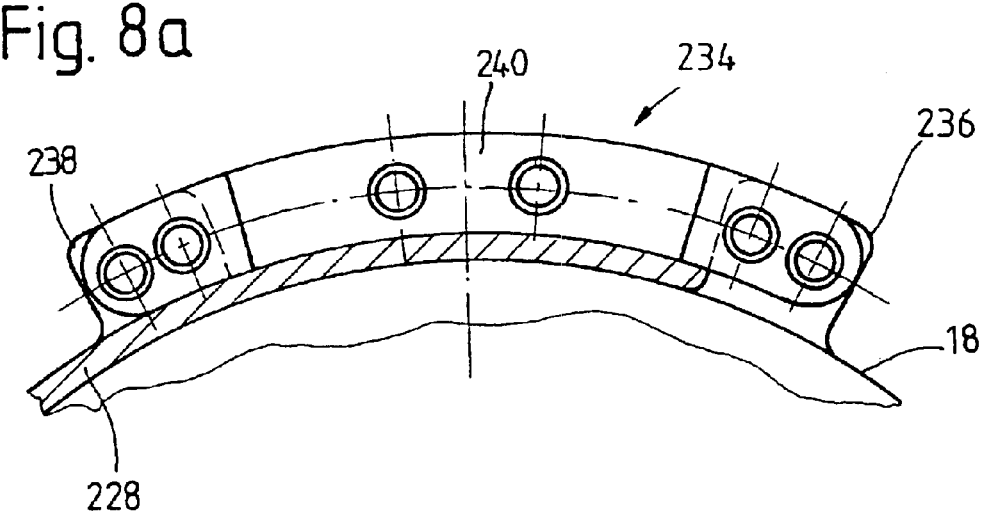
FIG. 8 shows partial axial views of two designed variants (FIGS. 8a and 8b) of the area in which the torsional vibration damper arrangement of the embodiment according to FIG. 7 is connected to the dual clutch arrangement.
Figure 8B:
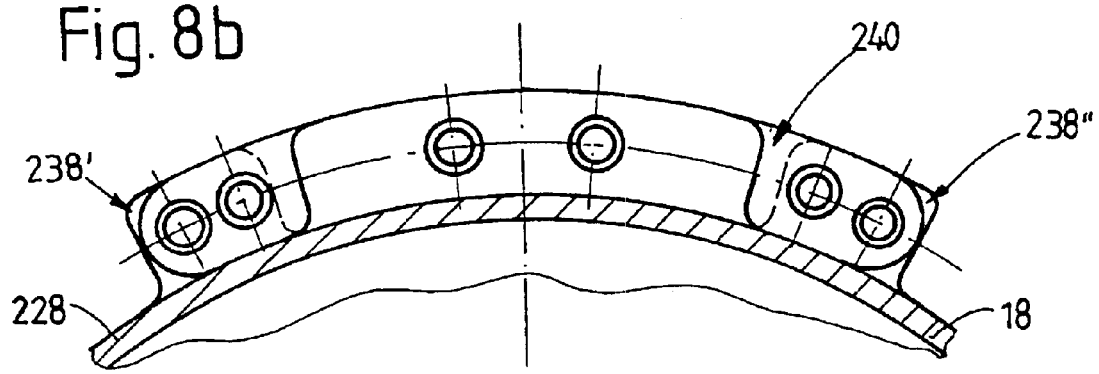

Another alternative embodiment is shown in FIG. 7. The design of the torsional vibration damper arrangement 120 is essentially the same as that described previously on the basis of FIG. 5. It can be seen, however, that a ring-shaped or cup-shaped connecting element 228 is also provided here, which can be rigidly connected to the cover disk element 132 by the threaded bolts 230. This connecting element 228 is connected by a connecting arrangement 234, also shown in FIG. 8, to the opposing support plate 18. It can be seen that both the opposing support plate 18 and the connecting element 228 have radially outward-extending connector projections 236, 238 at various points on their circumferences. Leaf spring elements 240 extending approximately in the circumferential direction connect in each case a projection 236 to a projection 238, so that an axially elastic coupling is created in this area between the torsional vibration damper arrangement 120 and the dual clutch 10. The connecting arrangement 234 preferably comprises a plurality of these types of leaf spring elements 240 distributed around the circumference, each with its own assigned projections 236, 238 (see FIG. 8*a*). Although a connection with elasticity in the axial direction is provided here, it is simultaneously ensured that the dual clutch 10 has radial guidance on the torsional vibration damper arrangement 120. It is also possible (see FIG. 8*b*) for the leaf spring element 240 to be connected at both ends to the projections 238' and 238" of the opposing support plate 18, and for the part of the leaf spring element 240 lying tangentially between the two ends, preferably the center of the leaf spring element, to be connected to the projection of the connecting element 228. It is also possible for the leaf spring element 240 to be connected at both ends to projections of the connecting element 228 and for the part between the ends to be connected to a projection of the opposing support plate 238 (not shown here). The axial support of the dual clutch 10 is provided here by way of the bearing 232, previously described above on the basis of FIG. 6, by means of which the housing component 40 is connected to the actuating mechanism 42. It should be pointed out that, in this embodiment as well, the connecting element 228 could be designed as an integral part of the cover disk element 134, as shown in the embodiment according to FIG. 5.

Figure 9:
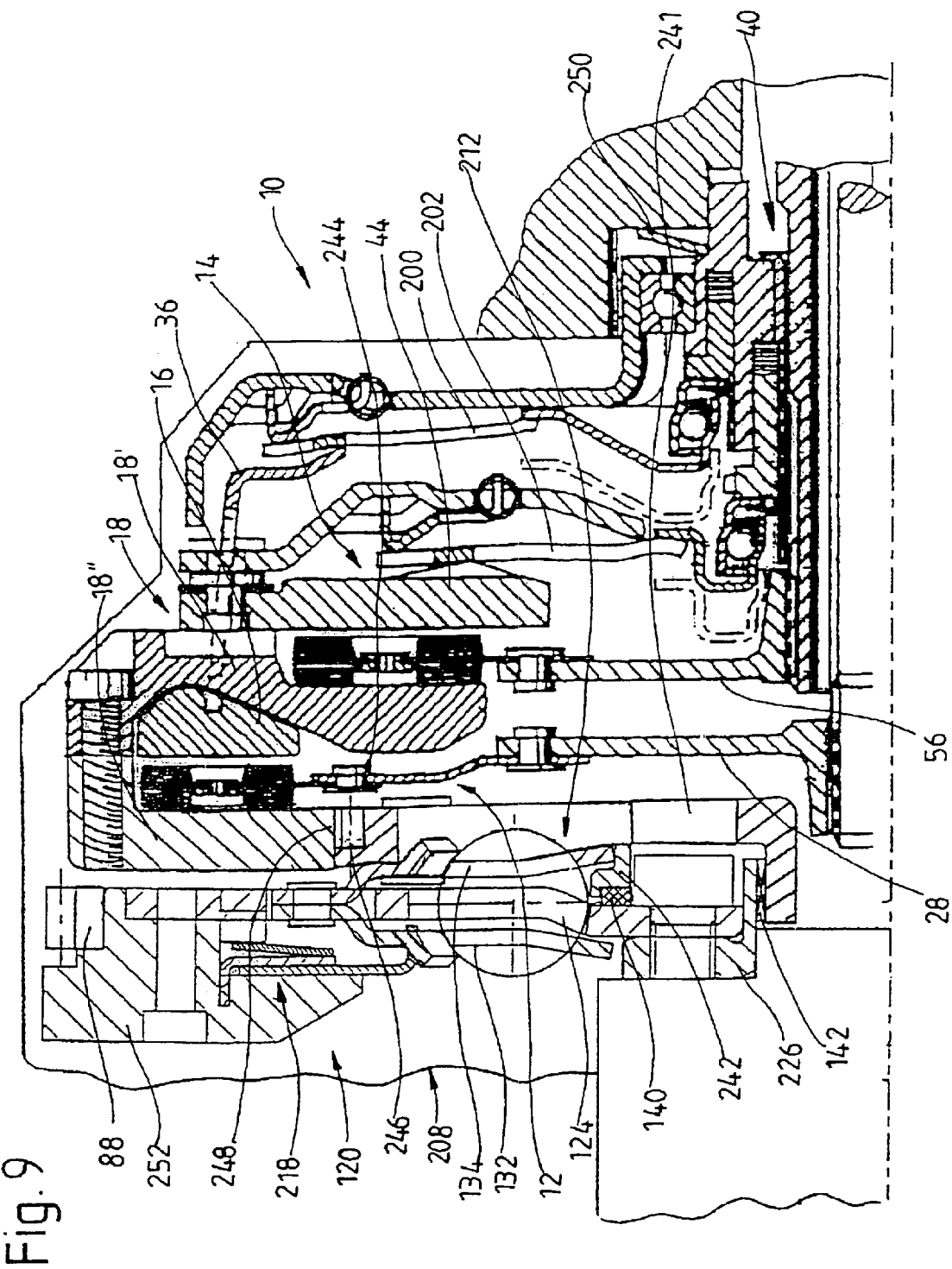
FIG. 9 shows another view, corresponding to FIG. 5, of an alternative embodiment of a dual clutch.

Another embodiment in which a torsional vibration damper arrangement 120 and a dual clutch 10 are staggered axially to a certain area but also overlap is shown in FIG. 9. We can see here a slightly different design of a dual clutch 10. The opposing support plate 18 comprises two plate parts 18' and 18", which are connected rigidly to each other in their radially outer areas. The plate part 18" to be positioned closer to the engine is connected, as will be described in greater detail below, to the secondary side of the torsional vibration damper arrangement 120. The two plate parts 18', 18" of the opposing support plate 18 have their friction surfaces for their assigned clutch disk 28, 56 on the same axial side. This means that the two pressure plate 16, 44 must be pushed in the same axial direction to become engaged, the pressure plate 44 of the second clutch area 14 again being under the direct action of the lever arrangement 202 previously mentioned in conjunction with FIG. 5. The lever arrangement 200 assigned to the first clutch area 12 acts on an actuating element 36 with an actuating section which passes through the pressure plate 44 and the plate part 18' and is thus able to act on the pressure plate 16, held in a recess in the plate part 18'.

The torsional vibration damper arrangement 120 again comprises the two cover disk elements 132, 134 of the secondary side 212. A plate-like connecting element 241, the radially inner part of which is supported radially by a bearing element 142 on an intermediate ring 226 of the primary side, is rigidly connected by riveting, etc., to the cover disk element 134 positioned on the transmission side.

Its axial support is provided by a bearing element 140, on which the connecting element 241 is axially supported by way of a ring-like intermediate element 242.

In its radially outer area, the connecting element 241 has external teeth 244, which are bounded axially by a support area 246. In a corresponding manner, the plate part 18″ of the opposing support plate 18, which has internal teeth 248, is pushed axially onto these outer teeth 244 until it comes to rest against the support area 246. To keep the two sets of teeth 244, 248 in engagement in this design variant, a spring element 250 is provided, by means of which the entire dual clutch 10, as it is being supported on the transmission, is pretensioned axially toward the engine and toward the torsional vibration damper 120. The spring element 250 acts on the actuating mechanism 42, which then transmits this axial support force to the dual clutch 10.

In this design variant the primary side 208 of the torsional vibration damper arrangement 120 comprises the central disk element 124 and a ring-shaped flywheel mass part 252, which is connected to the radially outer part of the disk by rivets, screws, a shrink-fit, etc., and which again caries the starter gear rim 88. The friction device 218 acts here between the flywheel mass part 252 and the cover disk element 132 of the secondary side 212.

In conclusion, it should be pointed out once again that, in the case of the previously described embodiments according to FIGS. 5–9, in which the axial overlap between the torsional vibration damper arrangement 120 and the dual clutch 10, especially the clutch area 12, leads to an axially compact unit, the torsional vibration damper arrangement 120 could also be designed so that the primary side has the two cover disk elements and the secondary side the central disk element. This obviously also applies to the design variants shown in FIGS. 3 and 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A multi-clutch arrangement comprising:
    a first clutch area comprising a first pressure plate, a first opposing support, and a first clutch disk which can be clamped between said first pressure plate and said opposing support to rotate about a common axis of rotation and to transmit torque via said first clutch area,
    a second clutch area comprising a second pressure plate, a second opposing support, and a second clutch disk which can be clamped between said second pressure plate and said second opposing support to rotate about said common axis of rotation and to transmit torque via said second clutch area,
    a first torsional vibration damper arrangement assigned to at least one of said first and second clutch areas and at least partially axially overlapping at least one of said first and second clutch areas, and
    a housing which supports said first and second clutch areas at least one of axially and radially with respect to a stationary assembly.

2. A multi-clutch arrangement as in claim 1 wherein said torsional vibration damper arrangement comprises at least one of said first and second opposing supports.

3. A multi-clutch arrangement as in claim 1 wherein said torsional vibration damper arrangement comprises
    a pair of cover disk elements connected rigidly together, at least one of said cover disk elements forming at least part of the opposing support of one of said clutch areas, and
    a central disk element between said cover disk elements and connected to said cover disk elements by means of a damper element arrangement for transmission of torque.

4. A multi-clutch arrangement as in claim 3 wherein each of said cover disk elements forms at least part of a respective one of said opposing supports.

5. A multi-clutch arrangement as in claim 3 wherein each of said cover disk elements comprises a friction surface area for frictional contact with a respective clutch disk, and a support area which interacts with said damper element arrangement, at least one of said support areas lying radially inside of the respective said friction surface area.

6. A multi-clutch arrangement as in claim 3 further comprising actuating force transmitting elements which pass through said central disk element and act upon at least one of said pressure plates for performing clutch engaging and clutch releasing operations, at least some of said actuating force transmitting elements cooperating with said central disk element to limit rotation of the torsional vibration damper arrangement.

7. A multi-clutch arrangement as in claim 6 wherein the actuating elements which cooperate with the central disk element pass through the opposing support assigned to the at least one of said pressure plates without any circumferential play.

8. A multi-clutch arrangement as in claim 1 further comprising a second torsional vibration damper arrangement.

9. A multi-clutch arrangement as in claim 8 wherein, with respect to transmission of torque, said second torsional vibration damper arrangement is arranged in series with said first torsional vibration damper arrangement.

10. A multi-clutch arrangement as in claim 9 wherein said second torsional vibration damper arrangement is provided in one of said clutch disks.

11. A multi-clutch arrangement as in claim 9 wherein said second torsional vibration damper arrangement has an input side for connecting to a drive element and an output side connected to the central disk element.

12. A multi-clutch arrangement as in claim 8 wherein, with respect to transmission of torque, the second torsional vibration damper arrangement is arranged in parallel with said first torsional vibration damper arrangement.

13. A multi-clutch arrangement as in claim 12 wherein said second torsional vibration damper arrangement has an input side for connecting to a drive element, and an output side, said input side being connected to an input area of said first torsional vibration damper, said output side being connected to an output area of said torsional vibration damper.

14. A multi-clutch arrangement as in claim 1 further comprising a bearing arrangement which supports an input area of said first torsional vibration damper arrangement at least one of axially and radially with respect to an output area of said first torsional vibration damper arrangement.

15. A multi-clutch arrangement as in claim 1 wherein said first torsional vibration damper arrangement comprises a frictional damping device.

16. A multi-clutch arrangement as in claim 15
wherein said first torsional vibration damper arrangement comprises comprises a damper element arrangement, said frictional damping device being located radially outside said damper element arrangement.

17. A multi-clutch arrangement comprising:
a first clutch area comprising a first pressure plate, a first opposing support, and a first clutch disk which can be clamped between said first pressure plate and said opposing support to rotate about a common axis of rotation and to transmit torque via said first clutch area,
a second clutch area comprising a second pressure plate, a second opposing support, and a second clutch disk which can be clamped between said second pressure plate and said second opposing support to rotate about said common axis of rotation and to transmit torque via said second clutch area, and
a first torsional vibration damper arrangement assigned to at least one of said first and second clutch areas and at least partially axially overlapping at least one of said first and second clutch areas,
wherein said first torsional vibration damper arrangement comprises a primary side, for connecting to a drive element, and a secondary side, connected to the opposing supports, the first torsional vibration damper arrangement comprising a damper element arrangement connecting said primary side to said secondary side,
wherein at least one of said secondary side and said damper element arrangement axially overlap at least part of at least one of the pressure plates and the opposing supports, and said damper element arrangement is essentially radially inside at least one of the pressure plate and the opposing support of one of the clutch areas.

18. A multi-clutch arrangement as in claim 17 wherein at least one of said secondary side and said damper element arrangement axially overlap at least part of at least one of the pressure plates and the opposing supports.

19. A multi-clutch arrangement as in claim 18 wherein said damper element arrangement is essentially radially inside at least one of the pressure plate and the opposing support of one of the clutch areas.

20. A multi-clutch arrangement as in claim 17 wherein said secondary side is connected to the opposing supports with axial elasticity.

21. A multi-clutch arrangement as in claim 17 further comprising means for supporting said secondary side at least axially with respect to said drive element.

22. A multi-clutch arrangement comprising:
a first clutch area comprising a first pressure plate, a first opposing support, and a first clutch disk which can be clamped between said first pressure plate and said opposing support to rotate about a common axis of rotation and to transmit torque via said first clutch area,
a second clutch area comprising a second pressure plate, a second opposing support, and a second clutch disk which can be clamped between said second pressure plate and said second opposing support to rotate about said common axis of rotation and to transmit torque via said second clutch area, and
a first torsional vibration damper arrangement assigned to at least one of said first and second clutch areas and at least partially axially overlapping at least one of said first and second clutch areas,
wherein said first torsional vibration damper arrangement comprises a primary side, for connecting to a drive element, and secondary side, connected to the opposing supports, the first torsional vibration damper arrangement comprising a damper element arrangement connecting said primary side to said secondary side, and wherein said secondary side is connected to the opposing supports with axial elasticity.

23. A multi-clutch arrangement comprising:
a first clutch area comprising a first pressure plate, a first opposing support, and a first clutch disk which can be clamped between said first pressure plate and said opposing support to rotate about a common axis of rotation and to transmit torque via said first clutch area,
a second clutch area comprising a second pressure plate, a second opposing support, and a second clutch disk which can be clamped between said second pressure plate and said second opposing support to rotate about said common axis of rotation and to transmit torque via said second clutch area, and
a first torsional vibration damper arrangement assigned to at least one of said first and second clutch areas and at least partially axially overlapping at least one of said first and second clutch areas,
wherein said first torsional vibration damper arrangement comprises a primary side, for connecting to a drive element, and a secondary side, connected to the opposing supports, the first torsional vibration damper arrangement comprising a damper element arrangement connecting said primary side to said secondary side, and further comprising means for supporting said secondary side at least axially with respect to said drive element.

* * * * *